United States Patent [19]

Hornung

[11] 3,916,402

[45] Oct. 28, 1975

[54] SYNCHRONIZATION OF DISPLAY FRAMES WITH PRIMARY POWER SOURCE

[75] Inventor: Louis Michael Hornung, Austin, Tex.

[73] Assignee: International Business Machines Corporation, Armonk, N.Y.

[22] Filed: Dec. 17, 1973

[21] Appl. No.: 425,385

[52] U.S. Cl. .................... 340/324 AD; 178/69.5 TV

[51] Int. Cl.² .............................................. G06F 3/14

[58] Field of Search ....... 340/324 AD; 178/69.5 TV

[56] References Cited

UNITED STATES PATENTS

| | | | |
|---|---|---|---|
| 3,598,911 | 8/1971 | Helbig | 340/324 AD |
| 3,705,263 | 12/1972 | Rittenhouse | 340/324 AD |
| 3,737,890 | 6/1973 | Salava | 340/324 AD |
| 3,787,819 | 1/1974 | Busink | 340/324 AD |

*Primary Examiner*—Marshall M. Curtis
*Attorney, Agent, or Firm*—Douglas H. Lefeve

[57] ABSTRACT

A dynamic shift register (DSR) refresh buffer is alternately clocked at one of two rates to complete exactly one revolution per frame of a cathode ray tube (CRT) display device which displays one frame per cycle of the primary power source supplying power to the display device. The time during which data codes are read from the DSR for display on the CRT (electronic frame time) is less than the minimum period of the primary power source. Variations in the period of the primary power source are absorbed by delaying the beginning of the subsequent frame until after the beginning of the subsequent period of the primary power source is detected. A positive peak detector is connected to the 60 Hz. AC primary power source which powers the CRT display. Display of a frame is begun at a fixed time delay after the detection of the positive peak of the primary power source. Data is displayed in synchronism with the normal rate of shifting of the DSR. At the end of the electronic frame time the rate of shifting characters in the DSR is halved and a counter is incremented upwardly from zero at a fixed rate until the next positive peak of the primary power source is detected. When the next positive peak is detected, the counter is incremented downwardly until it reaches zero, at which time the shift rate of characters in the DSR is restored to the normal rate. Subsequently, the fixed time delay from the detection of the positive peak expires, and display of the next frame begins. Characters continue to be shifted in the DSR at the normal rate until the end of the next electronic frame. In this manner a frame of characters is displayed and synchronized with each cycle of the primary power source powering the CRT.

12 Claims, 2 Drawing Figures

SYNCHRONIZATION OF DISPLAY FRAMES WITH PRIMARY POWER SOURCE

BACKGROUND OF THE INVENTION

1. Field of the Invention

This invention relates to display systems and more particularly to the synchronization of the display of a frame on an output device and a dynamic refresh buffer storing the data to be displayed.

2. Description of the Prior Art

In CRT display technology it is well known that advantages are realized if the frame rate of display of alphanumeric characters is derived from the frequency of the primary power source powering the display device. For example, display devices powered by 60 Hz. AC primary power sources may have a frame rate of 60 frames per second to avoid visual distortion that would otherwise occur if the frame rate of the display device were different from, but of the same order of magnitude as, the primary power source. Without synchronizing the frame rate to the primary power source, this visual distortion may be reduced, in part, by the utilization of power supplies employing highly sophisticated filtering and shielding techniques. However, it may be desirable to synchronize the frame rate with the AC power source regardless of the sophistication or expense of the display device power supply.

Synchronization of the display frame with the primary power source is rather easily achieved when a static type of storage device is used as the refresh buffer for a CRT display. It is generally desired to continually display a group of characters which are stored in the refresh buffer. Static storage devices of the kind known in the art as a random access memory may be sequentially addressed at a rate that will insure that all characters of the frame are read from the storage device in a time period which is compatible with the display device and character generator but shorter than the minimun period of the primary power source. This process can be repeated with the reading from the static storage refresh buffer beginning at the same storage address for each frame and beginning each frame after a particular characteristic of the AC primary power source, such as a positive or negative peak or zero crossing, is detected.

Or the static storage devices may be of the kind known in the art as static shift registers. Data is stored in the shift register in the order in which it is to be displayed as the electron beam sweeps the CRT. Shifting of the shift register is synchronized with the positioning of the electron beam. At the end of the display of a frame, the shift register is shifted to the first character to be displayed in the next frame. The shift register is held at this position indefinitely until the start of the next period of the primary power source is detected.

When a recirculating dynamic storage device is used as a refresh buffer, however, the problem of synchronizing the frame rate with the primary power surface for the display becomes more complex, because data can be viably stored in a dynamic storage device only by continual shifting of the data from one storage cell to the next. Shift rates at which dynamic storage devices operate reliably are usually limited to a definite range. They cannot be stopped indefinitely. The maximum time that they may be stopped is generally much less than the variation in a commercial primary power source.

A dynamic shift register (DSR) may be considered to be a closed, rotating loop of storage cells with a fixed port for reading data from the storage cells as they pass thereby. If a frame of characters is stored in the DSR for refresh of a CRT display, the storage cell storing the beginning character of the frame must be positioned at the port at the beginning of the display time. In a system displaying one frame per cycle of the primary power source supplying power to the display device, it would be relatively easy to insure that the beginning character storage cell is positioned at the port at the beginning of each display time if the frequency of the primary power were precisely known and if no deviations occured in this frequency. The main problem of frequency deviation is concentrated in the power source, because the percentage of deviation of the clocking frequency of the DSR (being derived from a crystal controlled oscillator) is usually insignificant compared to the percentage of deviation from the nominal frequency of the AC primary power source. Further, frequency deviation of the primary power source is totally beyond the control of the power user.

Since DSR costs have been lowered in recent years due to technological advances, it would be advantageous to achieve synchronization of a recirculating dynamic storage device with a primary power source powering a display device in a simple and economical manner.

SUMMARY OF THE INVENTION

Accordingly, a display refresh buffer is alternately clocked at one of two rates to complete exactly one revolution per frame of a display device which displays one frame per cycle of the primary power source supplying power to the display device. The time during which data codes are read from the buffer for display (the electronic frame time) is less than the minimum period of the primary power source. Variations in the period of the primary power source are absorbed by delaying the beginning of the subsequent frame until after the sensing of a characteristic of the power source waveform which indicates the beginning of the subsequent period of the primary power source.

In the preferred embodiment a positive peak detector is connected to the 60 Hz. AC primary power source which powers a CRT display. Display of a frame is begun at a fixed time delay after the detection of the positive peak of the primary power source. Duration of the fixed time delay is somewhat arbitrary, but it must be constant in order to achieve synchronization with the primary power source and to minimize distortion. Detection of the positive peak provides a means by which variations in primary power frequency may be measured. The time delay affords time to pace the dynamic shift register according to this measurement in order to achieve the desired synchronization.

Data is displayed in synchronism with the normal rate of shifting of the DSR. At the end of the electronic frame time the rate of shifting characters in the DSR refresh buffer is halved and a counter is incremented upwardly from zero at a fixed rate until the next positive peak of the primary power source is detected. Thereafter, the counter is incremented downwardly until it reaches zero, at which time the sift rate of characters in the DSR is doubled to the normal rate. Subsequently, the fixed time delay expires and display of the next frame begins. Characters continue to be shifted in the DSR at the faster rate as they are displayed until the end of the next electronic frame. In this manner a frame of characters is displayed and synchronized with each cycle of the primary power source powering the CRT.

It should be noted that data available from the refresh buffer during the interval between the end of one frame and the beginning of the next is not displayed and represents storage space which is necessary for synchronization only. In practice the number of storage devices used for the purpose is relatively small.

The foregoing and other features and advantages of the invention will be apparent from the following more particular description of a preferred embodiment of the invention, as illustrated in the accompanying drawing.

DETAILED DESCRIPTION OF THE PREFERRED EMBODIMENT

Figure 1:
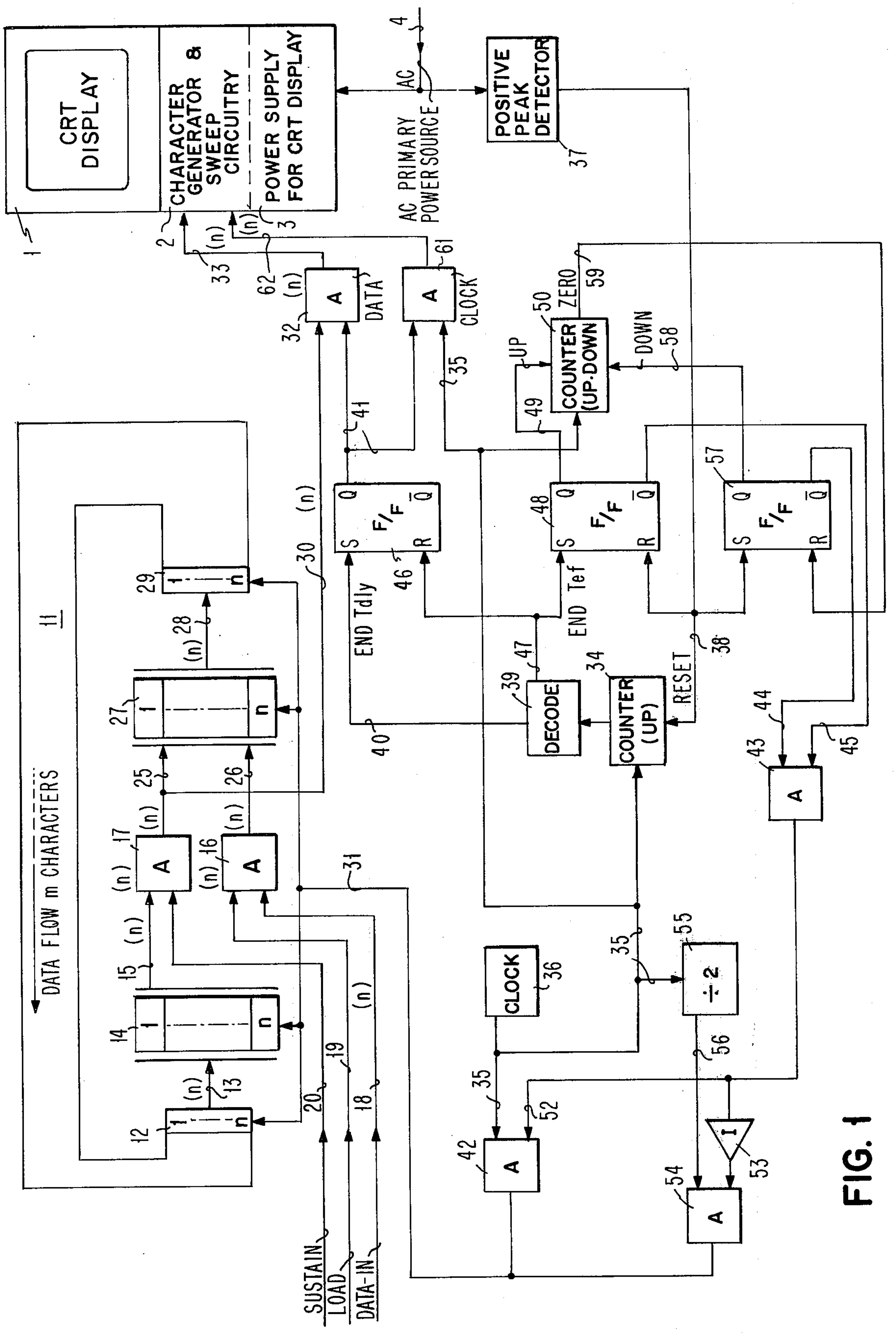
FIG. 1 is a schematic diagram of the preferred embodiment of the interconnection of logical elements for synchronization of display frames with a display device primary power source.

Reference is made to FIG. 1 which shows a CRT display 1 including a character generator and sweep circuitry 2 and a power supply 3 deriving power from a 60 Hz. AC primary power source. Display 1 and character generator and sweep circuitry 2 may be one of many such systems well known in the art for displaying alphanumeric characters stored in a refresh buffer for continual reading therefrom, and may be of the type described in U.S. Pat. No. 3,248,725 to P. R. Low, et al., Ser. No. 90,678, filed Feb. 21, 1961, issued Apr. 26, 1966, and entitled "Apparatus for Displaying Characters as a Sequence of Linear Visible Traces." Power supply 3 may take the form of any of a large number of well known power supplies which convert 60 Hz. AC line voltage to one or more DC voltages compatible with the display circuitry.

A refresh storage buffer storage 11 stores m data codes corresponding to alphanumeric characters to be displayed by display 1. Each of the m storage cells of buffer 11 are n bits in width, which depends, of course, on the number of different characters to be displayed by display 1.

For the purposes of description of the data flow in buffer 11, lines and logical elements having "(*n*)" adjacent thereto are considered to represent one of the n number of such parallel elements necessary for a buffer storing data codes n bits in width. Thus, lines and logical elements having the designation "(*n*)" adjacent thereto will be described in the plural sense rather than in the singular.

It is also assumed, for purposes of illustration, that logic requiring positive inputs for a positive output is employed unless indicated otherwise. That is, the logic circuits such as AND and OR circuits, for example, are operated by positive signal levels at the input to produce a positive level signal at the output. Logical levels which are not positive will be termed negative.

Data codes corresponding to characters to be displayed are loaded into buffer 11 from any of a variety of devices (not shown) such as a magnetic tape, a keyboard, a punched card, etc., along lines 18 in synchronism with the shifting pulses on line 31. During the loading of data codes into buffer 11, line 19 is activated enabling AND circuit 16 to pass the data codes along lines 26 to input register 27 and then along lines 28 into input cell 29 of buffer 11. After the data codes have been loaded into buffer 11, line 19 is deactivated which disenables AND circuits 16. The data codes are repeatedly circulated through buffer 11 by activating line 20 which enables AND circuits 17. Starting at input cell 29, data codes circulate through buffer 11 to output cell 12, then along lines 13, through output register 14, along lines 15, through AND circuits 17, along lines 25, through input register 27, along lines 28, and back into input cell 29. The data codes are shifted from one storage cell or register to the next by application of shifting pulses along line 31. Any of a number of well known dynamic storage devices employing alternate methods of data entry and accessing may be used for buffer 11, including the buffer described in U.S. Pat. No. 3,675,216 to R. L. James, Ser. No. 104,888, filed Jan. 8, 1971, issued July 4, 1972, and entitled "No Clock Shift Register and Control Technique."

Synchronization of buffer 11 to the 60 Hz. time base of the primary power source for display 1 is accomplished by utilizing the tolerance of buffer 11 to variations in its shift rate. Although buffer 11 is dynamic in nature (meaning that it cannot be stopped for longer than a very short period of time) it is usual that dynamic shift registers can be operated reliably over a relatively wide range of shift rates. In operation, the actual time during which characters are displayed on the CRT is less than the minimum period of the primary power source. Variations in the period of the primary power source are absorbed by delaying the beginning of the subsequent frame until after the sensing of a characteristic, such as a positive peak, which indicates the beginning of the subsequent period of the primary power source.

The following definitions will be useful for a more detailed discussion of this concept:

| | |
|---|---|
| $T_{ef}$ | Electronic frame time—time during which information is read from buffer 11 and written on the CRT screen; |
| $T_{pp}$ | Period of the primary power source—nominally, 167 ms; |
| $T_{dly}$ | Delay time—a fixed, predetermined period of time beginning at the "60 Hz. detect" and ending with the initiation of the beginning of the next display frame; |
| $T_m$ | Measured time—time measured from end of electronic frame to "60 Hz. detect"; and |
| $T_s$ | Time during which DRS is shifted at alternate rate. |

Figure 2:
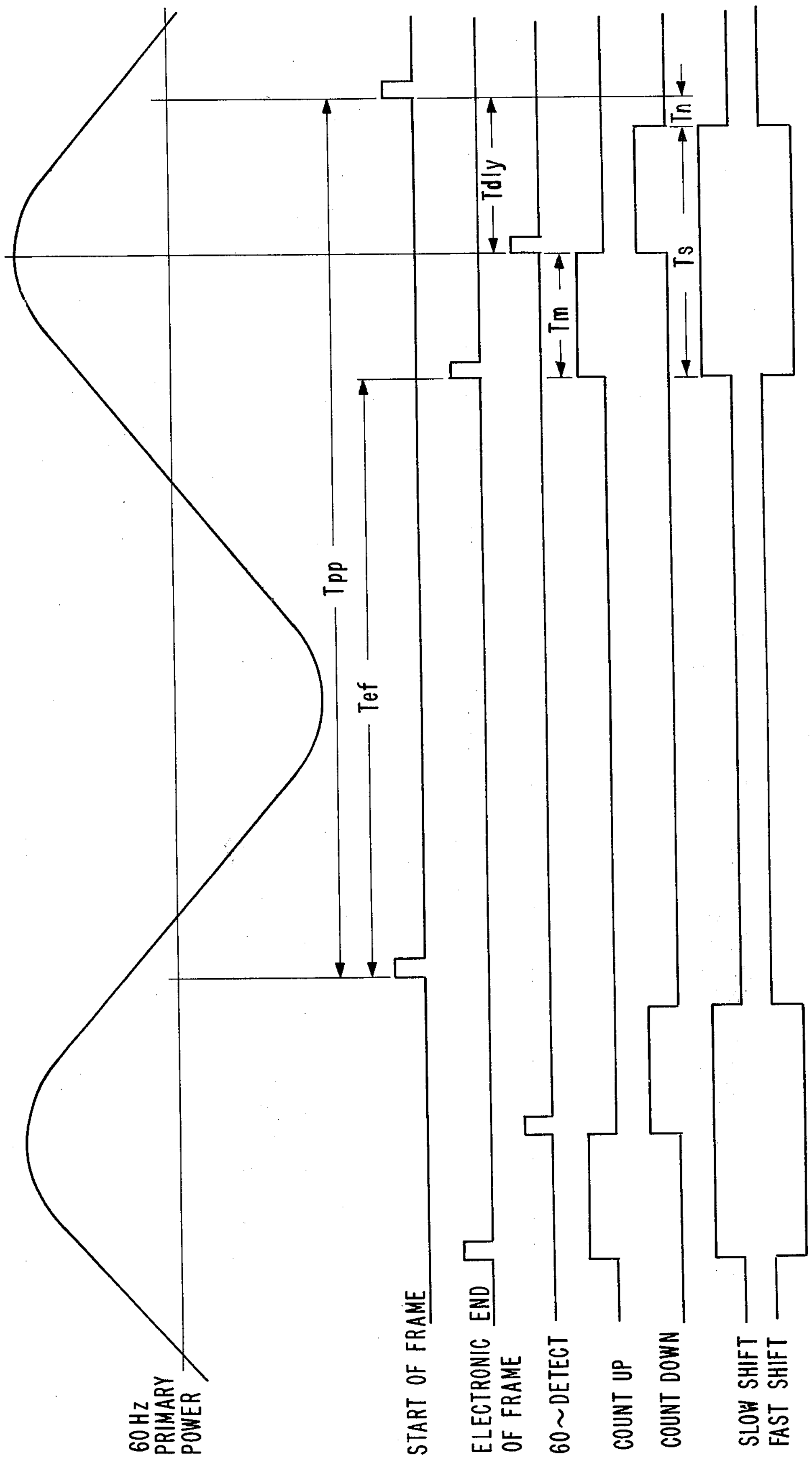
FIG. 2 is a timing diagram showing the relationship between the waveform of the primary power source and the beginning and end of display frames and shifting rates of the refresh buffer.

Reference is now made to FIG. 2 which serves as a graphical aid in the understanding of the following equations. It will be observed that:

$$T_{pp} = T_{ef} + T_m + T_{dly} \tag{1}$$

$T_{ef}$ is constant, because buffer 11 is shifted at a constant rate for a fixed number of positions during active display time.

The following definitions relate to the number of shift register storage cells or positions:

| | |
|---|---|
| $D_t$ | Total number of data code storage positions of buffer 11; |
| $D_{ef}$ | Number of data code storage positions shifted during $T_{ef}$; and |
| $D_{sync}$ | Number of data code storage positions to be utilized for synchronization. |

It will, therefore, be understood that:

$$D_{sync} = D_t - D_{ef} \quad (2)$$

Because $D_t$ and $D_{ef}$ are constants, $D_{sync}$ is also a constant. It is also necessary that the data codes in buffer 11 are sifted at a fixed rate during $T_{ef}$, because this is the electronic frame time during which characters corresponding to data codes are written on the CRT screen. The first data code buffer storage position of $D_{ef}$ must be positioned for reading by character generator 2 at the time $T_{ef}$ begins. The last of the $D_{ef}$ storage positions of buffer 11 will be read by character generator 2 at the end of $T_{ef}$. It will, thus, be seen that during the variable time $T_m$ and the fixed time $T_{dly}$ between the end of one $T_{ef}$ and the beginning of the next $T_{ef}$, the $D_{sync}$ storage positions must be shifted at varying rates to insure that the first of the $D_{ef}$ storage positions is positioned for reading by character generator 2 at the beginning of the next $T_{ef}$.

This variable rate of shifting of the $D_{sync}$ storage positions of buffer 11 is accomplished by shifting a portion of the $D_{sync}$ storage positions at one rate and the remainder of the $D_{sync}$ storage positions at another rate. How the time is proportioned between the two rates is determined by the time at which the detection of a particular characteristic in the primary power source waveform occurs, such as a positive peak.

In the preferred embodiment of this invention, the shifting rate beginning before $T_{ef}$ and ending at the end of $T_{ef}$ is referred to as the normal, or fast, rate. Beginning at the end of $T_{ef}$ a slow rate of one-half the normal rate is used for a number of shifts until subsequent shifting at the normal rate brings the first data code storage position of the frame to be displayed back to the beginning of buffer 11. The time during which the shift register is shifted at the slow rate is defined as $T_s$; and time between the end of one $T_{ef}$ and the beginning of the next $T_{ef}$ during which the data codes in buffer 11 are shifted at the normal rate is defined as $T_n$.

Referring again to FIG. 2, it will be seen that:

$$T_s + T_n = T_m + T_{dly} \quad (3)$$

It is known that the number of shifts during $T_m + T_{dly}$ or $T_s + T_n$ must be equal to $D_{sync}$ regardless ovalue of $T_m$. If the normal shift rate is designated to be $R_n$ and the slow shift rate is designated to be one-half $R_n$, the following equation results:

$$D_{sync} = (T_s)(\tfrac{1}{2}R_n) + (T_n)(R_n) \quad (4)$$

Simultaneous solution of equations (3) and (4) for $T_s$ produces the following equation:

$$T_s = 2T_m + 2T_{dly} - \frac{2D_{sync}}{R_n} \quad (5)$$

The term, $$2T_{dly} - \frac{2D_{sync}}{R_n}$$

is constant and can be arbitrarily chosen in a given design to be zero, which leaves the resulting equation:

$$T_s = 2T_m \quad (6)$$

The function of equation (6) may be implemented by counting up from zero at the end of $T_{ef}$ until a "60 Hz. detect" occurs, (such as the detection of a positive peak) and then counting down to zero. The time during which the counter is non-zero is the slow shift interval, $T_s$. Other ratios of normal shift rate and an alternate shift rate different from one-half the normal shift rate are possible, although implementation thereof may be more complex.

Referring now to FIGS. 1 and 2 the control logic and operation thereof will be described in more detail beginning immediately before the commencement of $T_{ef}$. At this time counter 34 is being incremented upward by clock pulses conveyed along line 35 from clock 36. Counter 34 had been previously reset by a signal produced by positive peak detector 37 at the positive peak at the 60 Hz. AC primary power source and transmitted along line 38 to the reset input of counter 34. Detector 37 may be of the type described in IBM *Technical Disclosure Bulletin*, Vol. 14, No. 1, page 41 (June 1971). Decode 39 produces an output along line 40 when a count is reached in counter 34 corresponding to the end of $T_{dly}$.

Thus, a signal appearing on line 40 marks the beginning of $T_{ef}$ and sets flip flop 46 which, in turn, provides a positive signal at the Q output thereof on line 41 enabling an input of AND circuits 32 to pass data codes along lines 33 into character generator and sweep circuitry 2. AND circuits 32 remain enabled by the positive level at the Q output of flip flop 46 until decode 39 produces a signal on line 47 at the end of $T_{ef}$ and flip flop 46 is reset. This lowers the logical level on line 41 and inhibits AND circuits 32 from gating further data codes to the display. AND circuit 61 is also enabled by the positive logical level on line 41 to gate clock pulses from line 35 onto line 62, the latter line being connected to the sweep circuitry of the display. If the system in the above-referenced U.S. Pat. No. 3,248,725 is used, line 62 may be connected to gate the clock signal in the time interval select unit 14, thereof.

During $T_{ef}$, flip flops 48 and 57 remain reset. Positive signal levels at the $\bar{Q}$ outputs thereof are conveyed along lines 45 and 44, respectively, to enable AND circuit 43. The positive signal level produced at the output of AND circuit 43 is conveyed along line 52 to enable AND circuit 42 to gate pulses from clock 36 onto line 31. Thus the data codes in buffer 11 are shifted at the normal, or fast, rate throughout $T_{ef}$.

The signal produced by decode 39 on line 47 corresponding to the end of $T_{ef}$ also sets flip flop 48 which produces a positive output on line 49, thereby enabling counter 50 to begin upwardly counting the pulses from clock 36 from an initial zero count in the counter 50. When flip flop 48 is set the logical level at output $\bar{Q}$ is lowered, thereby disenabling AND circuit 43 because of the negative logical level on line 45. The disenabling of AND circuit 43 causes AND circuit 42 to become disenabled because of the negative logical level on line 52. The disenabling of AND circuit 42 prevents further pulses from clock 36 to be gated therethrough. However, the negative logical level on line 52 is inverted by INVERT circuit 53, thereby enabling AND circuit 54. The frequency of the clock pulses on line 35 from clock 36 is divided by divider 55 and the slower pulses are transmitted along line 56 and gated through AND circuit 54 onto line 31 to shift the data codes in buffer 11 at the slow shifting rate of one-half the rate at which these data codes had been shifted during $T_{ef}$. Any of a number of divide-by-two devices may be used for divider 55 including, for example, a single, T flip flop.

Counter 50 continues to count upwardly until a positive peak in the 60 Hz. AC primary power source waveform is detected by peak detector 37. Upon detection of the peak, a signal produced by detector 37 and transmitted along line 38 resets flip flop 48 and sets flip flop 57. Whe flip flop 47 is reset the Q output thereof becomes lowered and counter 50 ceases upward counting because of the lowered signal level on line 49. However, flip flop 57 is set at this time and produces a positive level at the Q output thereof which is transmitted along line 58 to counter 50, causing counter 50 to begin counting downwardly from the maximum count reached while it was previously counting upwardly. Because flip flop 57 is now set, a negative logical level at the $\bar{Q}$ output thereof causes AND circuit 43 to continue to remain disenabled which, in turn, causes AND circuit 54 to continue to remain enabled, thereby allowing shifting pulses to continue to be gated therethrough at the slow rate.

When counter 50 has been incremented down to zero, an output signal is produced thereby on line 59 which resets flip flop 57. Since both flip flops 48 and 57 are now reset, positive levels appearing at the $\bar{Q}$ outputs thereof enable AND circuit 43 to produce a positive level on line 52. The positive level on line 52, inverted by INVERT circuit 53, disenables AND circuit 54 from gating slow shifting pulses onto line 31. However, the positive logical level on line 52 enables AND circuit 42 to gate the normal, or fast, rate shifting pulses from clock 36 onto line 31 to shift the data codes in buffer 11 at the normal rate.

When the positive peak detect signal occurred on line 38, thereby resetting flip flop 48 and setting flip flop 57, counter 34 was reset to begin counting the $T_{dly}$ time delay. At the end of this time delay a signal is produced on line 40 by decode 39 which sets flip flop 46 enabling AND circuit 32 to begin gating data codes for the next display frame.

The operation of the control logic, therefore, has been described for all states that the logical elements thereof assume during one complete cycle of operation. In the manner above described, frames of data codes to be displayed are synchronized with the AC primary power source powering the display device. It will be apparent that the data code storage positions of buffer 11 that are shifted during the time between the end of one display frame and the beginning of the next ($D_{sync}$) may be determined in accordance with the worst case frequency deviation of the primary power source. In other words, a larger number of otherwise unused data storage cells are required for synchronization when the frequency deviation of the power source is relatively large.

Thus, a display system has been described in which a dynamic refresh buffer thereof is alternately clocked at one of two rates to complete exactly one revolution per frame of a display device which displays one frame per cycle of the primary source powering said display device. Variations in the period of the primary power source are absorbed by delaying the beginning of the subsequent frame a fixed period of time after the detection of a characteristic (such as a positive peak) of the subsequent period of the primary power source.

While the invention has been shown and described with reference to a preferred embodiment thereof, it will be understood by those skilled in the art that the foregoing and other changes in form and details may be made therein without departing from the spirit and scope of the invention.

What is claimed is:

1. A system for displaying frames of characters and spaces, comprising:

recirculating dynamic storage means having a number of data code storage positions for storing data codes corresponding to data displayed in one of said frames and an additional number of storage positions;

display means connected to said storage means for displaying said frame, said display means being operative in response to a periodic waveform;

means for measuring the elapsed time, Tm, between the shifting of said data codes out of the last data code storage position of said frame and the occurrence of a particular characteristic of said waveform and;

control means for selectively shifting said data codes in said storage means through said additional number of storage positions at more than one rate during the time between frames, said control means including means for prorating the shifting of data codes among said more than one rate as a function of said elapsed time, Tm.

2. The system of claim 1 wherein said control means further comprises means for shifting said data codes more than one storage position after each occurrence of said particular characteristic of said periodic waveform.

3. The system of claim 2 wherein said control means further comprises:

oscillator means for generating storage means shifting pulses at a first rate; and division means for generating storage means shifting pulses at a second rate different from said first rate, said division means having an input connected to said oscillator means.

4. The system of claim 3 wherein said waveform is a sinusoidal waveform.

5. The system of claim 4 wherein said means for measuring said Tm further comprises a sensing means including a peak detector circuit.

6. The system of claim 5 wherein said storage means includes a dynamic shift register.

7. The system of claim 6 wherein said display means includes a cathode ray tube.

8. The system of claim 3 wherein said division means includes a divide-by-two circuit having an input connected to said oscillator means, whereby said second rate is one-half of said first rate.

9. The system of claim 8 wherein said control means includes a bi-directional counter, said counter being incremented from an initial count in a first direction at a fixed rate during the time between the shifting of said data codes out of the last data code storage position of said one of said frames and said occurrence of said characteristic of said waveform, said counter being incremented in an opposite direction at said fixed rate immediately subsequent to said occurrence of said characteristic until said initial count is reached, and said division means being connected to said storage means while said counter has a count therein other than said initial count.

10. A method of synchronizing the display of frames of characters and spaces with a periodic waveform by which a display device is energized, comprising:

storing data codes corresponding to one of said frames to be displayed in a recirculating dynamic shift register having a number of storage positions for storing said data codes and an additional number of storage positions;

measuring the elapsed time, Tm, between the shifting of said data codes out of the last data code storage positon of said frame and the occurrence of a particular characteristic of said waveform; shifting, in response to said shifting of said data codes out of said last data code storage position of one of said frames, said data codes through said additional number of storage positions at more than one rate during the time between frames, including;

prorating the shifting rates of said data codes as a function of said elapsed time, Tm.

11. The method of claim 10 wherein said step of shifting said data codes through said additional number of storage positions further comprises shifting said codes more than one position after said occurrence of said particular characteristic of said waveform.

12. The method of claim 11 wherein said step of shifing said data codes through said additional number of storage positions at more than one rate further comprises:

incrementing a counter from an initial count in a first direction at a fixed rate during the time between said shifting of said data codes out of said last data code storage position of said frame and said occurrence of said particular characteristic of said waveform;

incrementing said counter in an opposite direction at said fixed rate immediately subsequent to said occurrence of said characteristic of said waveform until said initial count is reached; and shifting said data codes in said storage means at a slower of said more than one rate while said counter has a count therein other than said initial count.

* * * * *